US011153173B1

(12) United States Patent
Rebeja

(10) Patent No.: US 11,153,173 B1
(45) Date of Patent: Oct. 19, 2021

(54) DYNAMICALLY UPDATING COMPUTE NODE LOCATION INFORMATION IN A DISTRIBUTED COMPUTING ENVIRONMENT

(71) Applicant: Juniper Networks, Inc., Sunnyvale, CA (US)

(72) Inventor: Leonid Rebeja, Toronto (CA)

(73) Assignee: Juniper Networks, Inc., Sunnyvale, CA (US)

( * ) Notice: Subject to any disclaimer, the term of this patent is extended or adjusted under 35 U.S.C. 154(b) by 6 days.

(21) Appl. No.: 16/566,554

(22) Filed: Sep. 10, 2019

(51) Int. Cl.
*G06F 15/16* (2006.01)
*H04L 12/24* (2006.01)
*H04L 29/08* (2006.01)
*H04L 12/40* (2006.01)
*H04L 12/751* (2013.01)
*H04L 29/12* (2006.01)

(52) U.S. Cl.
CPC .......... *H04L 41/12* (2013.01); *H04L 41/0853* (2013.01); *H04L 61/15* (2013.01); *H04L 61/2503* (2013.01); *H04L 67/327* (2013.01)

(58) Field of Classification Search
CPC ... H04L 41/12; H04L 61/2503; H04L 67/327; H04L 41/0853; H04L 61/15
USPC ........................................................ 709/226
See application file for complete search history.

(56) References Cited

U.S. PATENT DOCUMENTS

| | | | |
|---|---|---|---|
| 9,749,181 B2 * | 8/2017 | Cohn .................... | H04L 61/251 |
| 2003/0037177 A1 * | 2/2003 | Sutton .................. | H04L 41/024 |
| | | | 719/316 |
| 2003/0221124 A1 * | 11/2003 | Curran .................. | H04L 63/10 |
| | | | 726/12 |
| 2005/0234675 A1 * | 10/2005 | Tillotson ............... | G06F 40/221 |
| | | | 702/123 |
| 2006/0200494 A1 * | 9/2006 | Sparks .................. | H04L 41/12 |
| 2008/0183599 A1 * | 7/2008 | Hill ....................... | G06Q 99/00 |
| | | | 705/28 |

(Continued)

OTHER PUBLICATIONS

Bielicki, "LizardFS Documentation," accessed from https://buildmedia.readthedocs.org/media/pdf/lizardfs-docs/stable/lizardfs-docs.pdf, Jun. 15, 2018, 147 pp.

(Continued)

*Primary Examiner* — Zi Ye
*Assistant Examiner* — Berhanu Shitayewoldetadik
(74) *Attorney, Agent, or Firm* — Shumaker & Sieffert, P.A.

(57) ABSTRACT

An example controller node may, responsive to receiving a resource request from a client device, deploy a compute node for execution on a particular data center selected from data centers within a distributed computing system, and store at least one address assigned to the compute node in a node inventory data store. After storing the at least one address, and responsive to determining that the compute node is not accessible using the at least one address the controller node may determine, based on information received from the particular data center, that the compute node is still available for execution on the particular data center, and receive, from the particular data center, at least one updated address assigned to the compute node. The controller node may then update the node inventory data store to store the at least one updated address that is assigned to the compute node.

18 Claims, 8 Drawing Sheets

(56) References Cited

U.S. PATENT DOCUMENTS

| | | | | |
|---|---|---|---|---|
| 2011/0047084 | A1* | 2/2011 | Manzalini | G06F 9/505 705/301 |
| 2011/0078371 | A1* | 3/2011 | Resch | G06F 3/0656 711/114 |
| 2011/0106950 | A1* | 5/2011 | Schlack | H04L 47/783 709/226 |
| 2015/0012625 | A1* | 1/2015 | Patwardhan | H04L 61/103 709/221 |
| 2015/0040134 | A1* | 2/2015 | Leggette | G06F 3/0689 718/103 |
| 2015/0256410 | A1* | 9/2015 | Beshai | H04L 49/15 370/254 |
| 2016/0087847 | A1* | 3/2016 | Krithivas | H04L 41/044 709/224 |
| 2016/0299707 | A1* | 10/2016 | Botes | G06F 11/1076 |
| 2017/0187606 | A1* | 6/2017 | Chen | H04L 45/02 |
| 2017/0264493 | A1* | 9/2017 | Cencini | H04L 67/1012 |
| 2017/0351588 | A1* | 12/2017 | Brown | G06F 11/2033 |
| 2018/0260125 | A1* | 9/2018 | Botes | G06F 3/067 |
| 2018/0270301 | A1* | 9/2018 | Zhang | G06F 9/4494 |
| 2019/0065082 | A1* | 2/2019 | Penney | G11C 7/1006 |
| 2019/0163754 | A1* | 5/2019 | Huang | G06F 16/2386 |
| 2019/0205184 | A1* | 7/2019 | Zhang | G06F 9/4881 |
| 2019/0205186 | A1* | 7/2019 | Zhang | G06F 9/4881 |
| 2019/0312772 | A1* | 10/2019 | Zhao | G06N 3/08 |
| 2019/0334909 | A1* | 10/2019 | Schmitt | G06F 3/0604 |
| 2019/0340374 | A1* | 11/2019 | Gupta | G06F 16/907 |
| 2020/0014609 | A1* | 1/2020 | Hockett | H04L 67/18 |
| 2020/0050586 | A1* | 2/2020 | Pal | G06F 16/13 |
| 2020/0084103 | A1* | 3/2020 | Miller | H04L 45/586 |
| 2020/0311096 | A1* | 10/2020 | Murthy | G06F 9/54 |

OTHER PUBLICATIONS

"LizardFS, White paper Version 3.12," accessed from https://lizardfs.com/wp-content/uploads/2018/06/whitepaper_lizard_v3.12_web.pdf, Jun. 2018, 23 pp.

"LizardFS, White paper Version 3.10," accessed from https://lizardfs.com/wp-content/uploads/2017/01/LizardFS-WhitePaper-Eng-v9-3.10-web-18oct-small.pdf, Jan. 2017, 20 pp.

"Introduction to LizardFS," LizardFS Handbook, accessed from https://docs.lizardfs.com/introduction.html, accessed on May 7, 2020, 4 pp.

"What Lizard Gives You," Lizard FS, accessed from https://lizardfs.com/, accessed on May 7, 2020, 4 pp.

"LizardFS is an Open Source Distributed File System licensed under GPLv3," GitHub, LizardFS, accessed from https://github.com/lizardfs/lizardfs, accessed on May 7, 2020, 2 pp.

"Welcome to LizardFS's documentation," LizardFS Handbook, accessed from https://docs.lizardfs.com/, accessed on May 7, 2020, 3 pp.

YouTube, "FOSDEM 2017—Storage overloaded to smoke? Legolize with LizardFS!," uploaded by LizardFS Software Defined Storage, Feb. 7, 2017, accessed from https://www.youtube.com/watch?v=gz3XAfAbfxl, 1 pp.

YouTube, "LizardFS on FOSDEM 2018 "Year in Development,"" uploaded by LizardFS Software Defined Storage, Mar. 2, 2018, accessed from https://www.youtube.com/watch?v=vpaanFRRjBk, 1 pp.

YouTube, "LizardFS as a storage for Elasticsearch," uploaded by LizardFS Software Defined Storage, Sep. 14, 2018, accessed from https://www.youtube.com/watch?v=jSodzbA2o9l, 1 pp.

YouTube, "LizardFS Intro," uploaded by LizardFS Software Defined Storage, Aug. 7, 2018, accessed from https://www.youtube.com/watch?v=oPASAHS2-D0, 1 pp.

YouTube, "LizardFS presentation," uploaded by LizardFS Software Defined Storage, Mar. 28, 2018, accessed from https://www.youtube.com/watch?v=H9dOue6EJz0, 1 pp.

YouTube, "FOSDEM 2018 Lizardfs Opennebula Connector release," uploaded by LizardFS Software Defined Storage, Mar. 2, 2018, accessed from https://www.youtube.com/watch?v=MFP1CvggpEM, 1 pp.

YouTube, "LizardFS Software Defined Sotrage," uploaded by LizardFS Software Defined Storage, Aug. 16, 2016, accessed from https://www.youtube.com/watch?v=ILjZD97Lbo4, 1 pp.

YouTube, "LizardFS @ Platige Image," uploaded by LizardFS Software Defined Storage, Jun. 22, 2016, accessed from https://www.youtube.com/watch?v=dZ4Fx48d3jM, 1 pp.

YouTube,"LizardFS native Windows client," uploaded by LizardFS Software Defined Storage, Jun. 21, 2016, accessed from https://www.youtube.com/watch?v=KKDaeVALHV4, 1 pp.

U.S. Appl. No. 16/118,107, filed by Vinay Chandrakant Rao, filed Aug. 30, 2018.

* cited by examiner

DYNAMICALLY UPDATING COMPUTE NODE LOCATION INFORMATION IN A DISTRIBUTED COMPUTING ENVIRONMENT

TECHNICAL FIELD

This disclosure relates to data processing within computer networks.

BACKGROUND

In a typical data center, a large collection of interconnected servers provides computing and/or storage capacity for execution of various applications. For example, a data center may comprise a facility that hosts applications and services for subscribers or customers of the data center. The data center may, for example, host infrastructure equipment, such as networking and storage systems, redundant power supplies, and environmental controls. In some data centers, clusters of storage systems and application servers are interconnected via a high-speed network fabric provided by one or more tiers of physical network devices, such as switches and routers. Certain sophisticated enterprises and service providers may employ multiple data centers with infrastructure that is spread throughout the world, with subscriber support equipment located in various physical hosting facilities.

Data centers are becoming a core foundation of the modern information technology (IT) infrastructure. In particular, modern data centers have extensively utilized virtualized environments in which various entities, such as compute nodes and/or containers, are deployed and executed on an underlying compute platform composed of physical computing devices. The data centers included within a distributed computing environment may include local (e.g., on-premises) data centers that are geographically co-located with a client or customer site, as well as third-party remote (e.g., cloud) data centers that are provided by one or more service providers.

SUMMARY

In general, this disclosure describes techniques for dynamically updating the location information of compute nodes that are deployed within a distributed computing environment. The distributed computing environment may include one or more data centers, such as an on-premises data center and/or any remote (e.g., cloud) data centers. Over the course of time, various compute nodes may be deployed within the distributed computing environment. However, one or more of these compute nodes may be temporarily stopped, disabled, or otherwise taken offline. According to techniques of the present disclosure, a control system or node is configured to dynamically and periodically check the availability status of various compute nodes that have been deployed within the distributed environment, and may update the location information (e.g., address information) for these nodes in a global node inventory after the nodes have been re-started, re-enabled, or otherwise brought back online. In such fashion, the disclosed techniques enable the system to more rapidly and effectively re-establish communications with compute nodes that were temporarily unavailable, but that are subsequently brought back online and available for further processing within the system. The disclosed techniques also enable the system to temporarily block all attempted user operations with nodes until these nodes are once again available and accessible to the system, thereby enabling the recovery and usability of the nodes within the system.

In one example, a method includes, responsive to receiving a resource request from a client device, deploying, by a controller node executed by one or more processors, and for execution on a particular data center selected from a plurality of data centers within a distributed computing system, a compute node, and storing, by the controller node and in a node inventory data store, at least one address assigned to the compute node. The example method further includes, after storing the at least one address, and responsive to determining that the compute node is not accessible using the at least one address: determining, by the controller node and based on information received from the particular data center, that the compute node is still available for execution on the particular data center; receiving, by the controller node and from the particular data center, at least one updated address assigned to the compute node; and updating, by the controller node, the node inventory data store to store the at least one updated address assigned to the compute node.

In another example, a computing system includes one or more processors and at least one computer-readable storage medium. The at least one computer-readable storage medium stored instructions that, when executed, cause the one or more processors to: responsive to receiving a resource request from a client device, deploy, by a controller node, and for execution on a particular data center selected from a plurality of data centers within a distributed computing system, a compute node; store, by the controller node and in a node inventory data store, at least one address assigned to the compute node; and after storing the at least one address, and responsive to determining that the compute node is not accessible using the at least one address: determine, by the controller node and based on information received from the particular data center, that the compute node is still available for execution on the particular data center; receive, by the controller node and from the particular data center, at least one updated address assigned to the compute node; and update, by the controller node, the node inventory data store to store the at least one updated address assigned to the compute node.

In another example, a computer-readable storage medium stores instructions that are executable by at least one processor to: responsive to receiving a resource request from a client device, deploy, by a controller node, and for execution on a particular data center selected from a plurality of data centers within a distributed computing system, a compute node; store, by the controller node and in a node inventory data store, at least one address assigned to the compute node; and after storing the at least one address, and responsive to determining that the compute node is not accessible using the at least one address: determine, by the controller node and based on information received from the particular data center, that the compute node is still available for execution on the particular data center; receive, by the controller node and from the particular data center, at least one updated address assigned to the compute node; and update, by the controller node, the node inventory data store to store the at least one updated address assigned to the compute node.

The details of one or more examples are set forth in the accompanying drawings and the description below. Other features, objects, and advantages will be apparent from the description and drawings, and from the claims.

DETAILED DESCRIPTION

Figure 1:
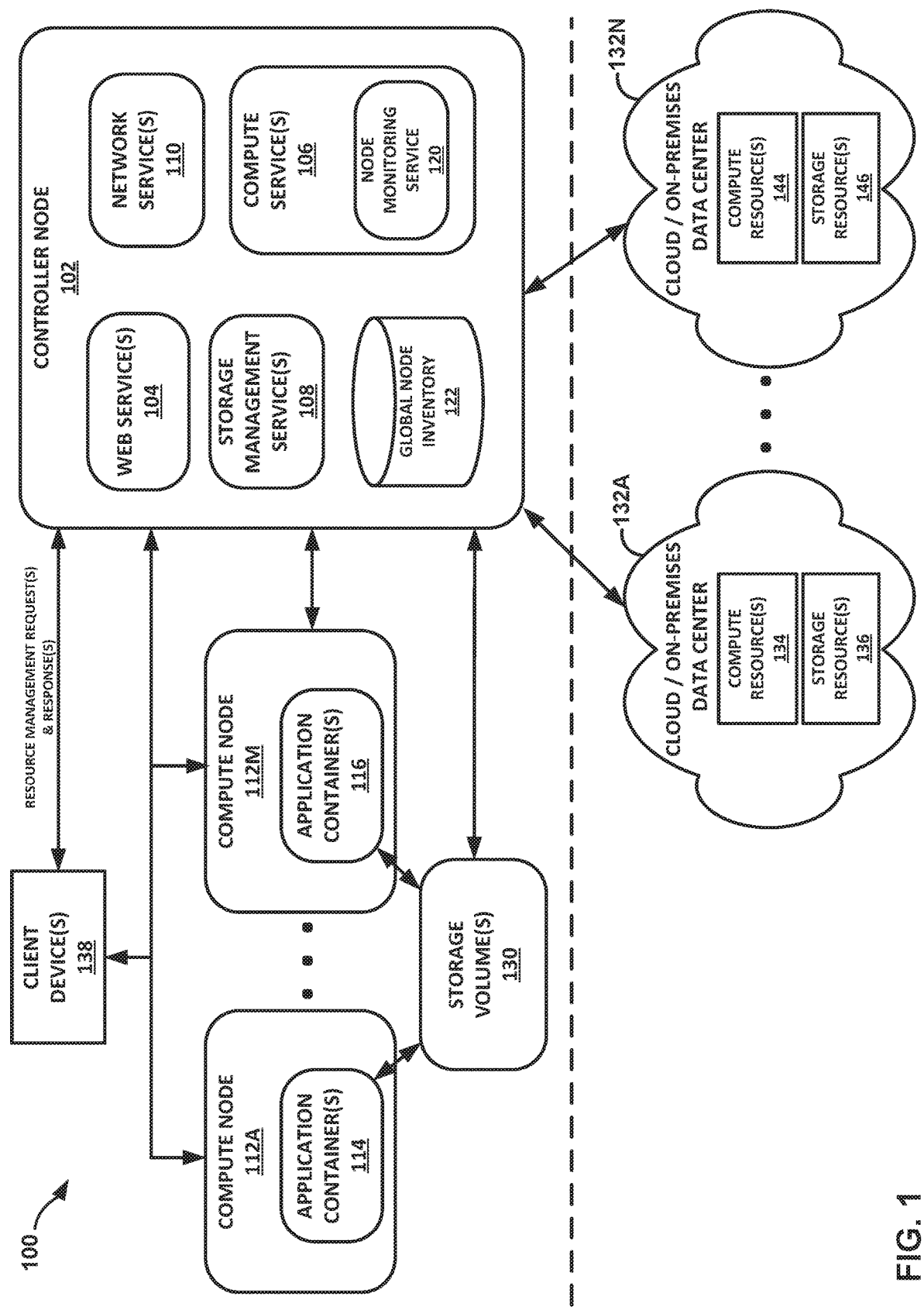
FIG. 1 is a block diagram illustrating an example distributed computing environment in which compute nodes are created across multiple different cloud and/or on-premises data centers, in accordance with one or more techniques of the disclosure.

As noted above, data centers are becoming a core foundation of the modern information technology (IT) infrastructure. In some data centers, a large collection of interconnected computing devices (e.g., real or virtual servers) may provide computing and/or storage capacity for execution of various applications. For instance, a data center may comprise a facility that hosts applications and services for customers of the data center, which may comprise a local or remote data center. Modern data centers have extensively utilized virtualized environments in which virtual hosts, such virtual machines or containers, are deployed and executed on an underlying compute platform composed of physical computing devices. As used herein, the term data center may refer to physical location(s) or frameworks for the data center, and/or the computing infrastructure (e.g., compute and/or storage resources) included in or otherwise provided by the data center.

The data centers included within a distributed computing system may include local (e.g., on-premises) data centers that are geographically co-located with a client or customer site, as well as third-party remote (e.g., cloud) data centers that are provided by one or more service providers. Enterprises that implement or execute applications within a distributed computing system often have choices as to whether to instantiate application workloads, such as virtual machines or containers, within one of their own private, local data centers and/or in a public, remote data center operated by third-party service provider. Each individual data center may comprise computing devices or servers that are geographically co-located, in one geographic location, or that are dispersed across multiple different locations. Each data center may include systems that provide one or more compute resources and/or storage resources (e.g., virtual and/or physical resources), which may be utilized by one or more applications. For instance, compute resources may include one or more compute nodes, which are virtual or physical nodes that provide computing power and/or functionality within the respective data centers. As one example, a compute node may comprise a virtual machine that is configured to provide one or more application containers in which applications are executed.

Virtualization within a data center can provide several advantages. One advantage is that virtualization can provide significant improvements to efficiency. As the underlying physical computing devices (e.g., servers) have become increasingly powerful with the advent of multicore microprocessor architectures with a large number of cores per physical processing unit, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier.

In general, this disclosure describes techniques for dynamically updating the location information of compute nodes that are deployed within a distributed computing environment. The distributed computing environment may include one or more data centers, such as an on-premises data center and/or any remote (e.g., cloud) data centers. Over time, one or more deployed compute nodes may be temporarily stopped, disabled, or otherwise taken offline. For instance, a user such as an administrator may stop or disable a compute node that is deployed on a particular data center, but may later re-start this compute node after a period of time. According to techniques of the present disclosure, a controller node may be configured to dynamically and periodically check the availability status of various compute nodes that have been deployed within the distributed environment, and may update the location information (e.g., address information) for these nodes in a global node inventory after the nodes have been re-started, re-enabled, or otherwise brought back online.

In some cases, as will be described in further detail below, the controller node may periodically attempt to access previously deployed compute nodes in the system using one or more of their previously assigned addresses (e.g., via connectivity detection messages, such as "ping" messages, sent to their external and/or local Internet Protocol (IP) addresses), and may mark the status as unavailable, within the node inventory, of any nodes that are not accessible using their previously assigned addresses. If one or more of the nodes that were temporarily unavailable are once again re-started, re-enabled, or otherwise brought back online, the controller node is configured to identify that these nodes are once again available within the system, and to update the status of these nodes as once again available within the node inventory. The controller node may also store the updated addresses for these nodes within the node inventory, such that the nodes are once again fully accessible by other entities in the system. According to certain examples, one or more background processes may implement the processes described herein. For example, a first background process may be configured to identify nodes that are currently unavailable, and a second background process may be configured to update the addresses (e.g., IP addresses) of nodes within the node inventory once these nodes are back online and available for execution within the system.

In such fashion, the disclosed techniques enable the system to more rapidly and effectively re-establish communications with compute nodes that were temporarily unavailable, but that are subsequently brought back online and available for further processing within the system. The disclosed techniques also enable the system to temporarily block all attempted user operations with nodes until these nodes are once again available and accessible to the system, thereby enabling the recovery and usability of compute nodes within the system.

FIG. 1 is a block diagram illustrating an example distributed computing environment 100 in which compute nodes 112A-112M (hereinafter, "compute nodes 112) are created and deployed across multiple different cloud and/or on-premises data centers 132A-132N (hereinafter, "data centers 132"), in accordance with one or more techniques of the disclosure. As illustrated in FIG. 1, data centers 132 may include one or more on-premises data centers, which may be local to a customer or client site (e.g., geographically co-located with client devices 138). Data centers 132 may also include one or more cloud data centers that are remote from the customer or client site (e.g., geographically remote from client devices 138), and which are provided and/or maintained by one or more respective service providers. For example, data center 132A may be provided and/maintained by one particular third-party service provider (e.g., service provider "A"), and data center 132N may be provided and/or maintained by a different third-party service provider (e.g., service provider "N"). Each one of data centers 132 may be physically located at one geographical location or distributed among different geographical locations.

In general, one or more of data centers 132 may provide an operating environment for applications and services for compute and/or storage resources that are included in or coupled to the respective data center. One or more of data centers 132 may, for example, host infrastructure equipment, such as networking and storage systems, redundant power supplies, and environmental controls. In some examples, a service provider network that couples resources to one or more of data centers 132 may be coupled to one or more networks administered by other providers, and may thus form part of a large-scale public network infrastructure, e.g., the Internet. In the example of FIG. 1, data center 132A includes one or more compute resources 134 and one or more storage resources 136. Compute resources 134 and storage resources 136 may each include one or more respective virtual or physical resources. Similarly, data center 132N includes one or more compute resources 144 and one or more storage resources 146.

In some examples, data centers 132 may each represent one or more geographically distributed network data centers. Data centers 132 may be facilities that provides network services for customer devices (e.g., one or more client devices 138), which may be, e.g., devices of entities such as enterprises and governments or individuals. For example, a network data center may host web services for several enterprises and end users. Other example services may include data storage, virtual private networks, traffic engineering, file service, data mining, scientific- or super-computing, and so on. In some cases, data centers 132 may include individual network servers, network peers, or otherwise.

In various examples, one or more of data centers 132 may each include a set of storage systems and application servers (e.g., within their respective compute and/or storage resources), which are interconnected via an Internet protocol (IP) fabric, and which may comprise a fabric provided by one or more tiers of physical network devices, such as, for example, routers, gateways, switches, hubs, modems, bridges, repeaters, multiplexers, servers, virtual machines running on one or more of the same, and other example network devices. The IP fabric may be part of one or more network resources provided by each respective one of data centers 132. In certain examples, the IP fabric may include three tiers of devices: one or more spine devices, one or more aggregation devices, and one or more leaf devices. Other topologies may be used in other examples. The servers may provide execution and storage environments for applications and data associated with customer devices and may be physical servers, virtual machines or combinations thereof.

As noted above, data centers 132 may each include one or more compute resources and one or more storage resources. For example, data center 132A includes compute resources 134 and storage resources 136, while data center 132N includes compute resources 144 and storage resources 146. Although not shown in FIG. 1, each one of data centers 132 may also include one or more network resources, as indicated in the description above.

In distributed environment or system 100, client devices 138 are communicatively coupled to a controller node 102 and compute nodes 112. Each of nodes 102 and/or 112 may be instances of compute resources provided by data centers 132 (e.g., compute resources 134 of data center 132A and/or compute resources 144 of data center 132N), and may each comprise one or more physical devices (e.g., computing devices, server devices, client devices), virtual devices (e.g., virtual machines), or other entities. Controller node 102 may be communicatively coupled to each of compute nodes 112 and to client devices 138, and controller node 102 may receive one or more resource management requests from client devices 138, as described in further detail below.

Controller node 102 may include or otherwise provide various different services or applications. As shown in the example of FIG. 1, controller node 102 includes one or more web services 104, one or more compute services 106, one or more network services 110, one or more storage management services 108, and a global node inventory 122. Each of the services or applications provided by controller node 102 may be implemented or executed in one or more application containers that are deployed by controller node 102. For example, web services 104 may be executed in one or more web application containers that are deployed by controller node 102. Compute services 106 may be executed in one or more compute service containers deployed by controller node 102. Network services 110 may be executed in one or more network service containers deployed by controller node 102. Storage management services 108 may be executed in one or more storage management containers deployed by controller node 102.

Web applications 104 may include or more web applications that are executable by client devices 138, including applications that provide graphical user interface functionality. Compute services 106 may provide various compute and processing functionality in system 100. Network services 110 may include networking and network management services to system 100. Storage management services 108 may provide storage management functionality in system 100, including management of storage volumes that are included or otherwise provided by storage management services 108. Storage management services 108 may provide a persistent data storage layer that is virtually positioned over data centers 132. Rather than directly accessing data that is stored on data centers 132, client devices 138 and nodes 102, 112 may access virtual data referred to as storage volumes 130, which are associated with data stored directly on data centers 132. Storage volumes 130 may be examples of storage resources that are provided by data centers 132 (e.g., storage resources 136 provided by data center 132A, storage resources provided by data center 132N).

As noted above, controller node 102 and compute nodes 112 may each comprise virtual and/or physical compute resources that are provided by data centers 132 (e.g., compute resources 134 of data center 132A, compute resources 144 of data center 132N). For example, each of nodes 112 may comprise one or more virtual machines that is configured to execute one or more respective application containers. As shown in the example of FIG. 1, compute node 112A includes one or more such application containers 114, and compute node 112M includes one or more application containers 116. One or more respective applications may be executed with each of application containers 114, 116. The techniques described may be used to support a container-centric cloud computing environment, such as that described in U.S. application Ser. No. 16/118,107, filed Aug. 30, 2018, which is incorporated herein by reference in its entirety.

Storage volumes 130 may be attached to individual application containers, such as application containers 114 or 116, which may then access any attached storage volumes 130 for data read and/or write operations for application data that is associated with the respective storage volumes. Storage volumes 130 may be associated with an amount of virtual, collective storage data provided by data centers 132. For example, if data centers 132 collectively provide 100 terabytes (TB) of data that is allocated in system 100, storage volumes 130 collectively may be associated with this 100 TB of data, and may enable virtual access to such data by client devices 138 and nodes 102, 112.

As shown in FIG. 1, controller node 102 also includes a node monitoring service 120 within compute services 106, as well as a global node inventory 122. Node monitoring service 120 is configured to monitor the status, such as the accessibility and/or availability, of nodes that have been created and deployed within system 100. In various examples, accessibility may be monitored or determined through attempted connectivity checks or messages using one or more stored addresses associated with given compute nodes. In various examples, availability may be monitored or determined by assessing whether given compute nodes have been started, enabled, or otherwise in an online state.

As outlined above, controller node 102 may receive various resource management requests from client devices 138. For example, over time, controller node 102 may receive resource requests from client devices 138 to create and deploy one or more of compute nodes 112 for execution on one or more of data centers 132. In some cases, client devices 138 may specify one or more of data centers 132 on which the requested compute nodes are to be deployed. In other cases, controller node 102 may determine the one or more of data centers 132 on which the requested compute nodes are to be deployed (e.g., based on the type/number of requested compute nodes and/or the current bandwidth/availability of compute resources on data centers 132).

Figure 2:
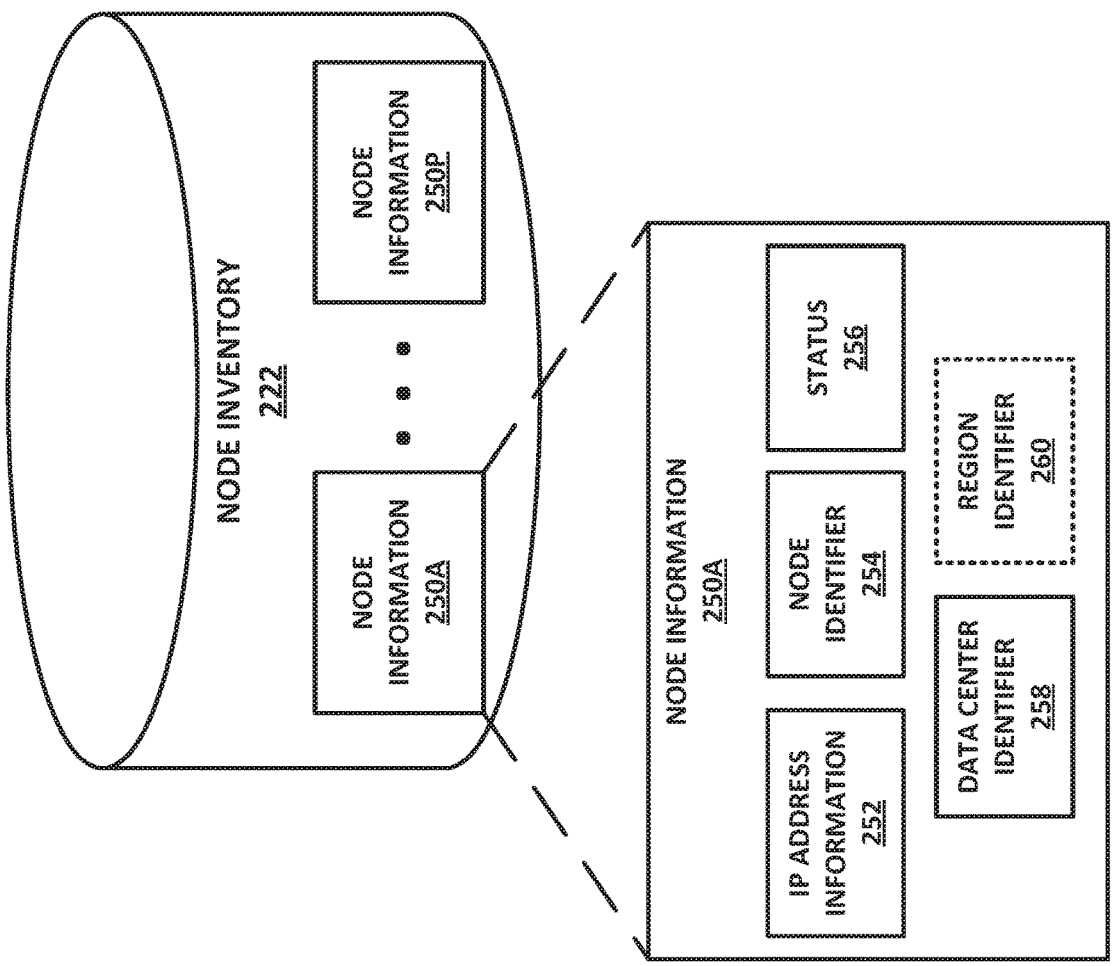
FIG. 2 is a block diagram illustrating an example of a node inventory data store that includes node information for one or more compute nodes, in accordance with one or more techniques of the disclosure.

When deploying compute nodes 112, node monitoring service 120 may store one or more addresses that are assigned to each deployed compute node within global node inventory 122. For example, when controller node 102 receives a request from client devices 138 to create and deploy a new compute node 112A, controller node 102 may determine to deploy compute node 112A on data center 132A. In this example, compute node 112A may be one of compute resources 134 provided by data center 132A. Compute node 112A may have one or more assigned addresses (e.g., one or more IP addresses that are assigned by data center 132A and/or compute services 106, such as a local and/or an external IP address). Node monitoring service 120 may store these one or more assigned addresses in global node inventory 122 for compute node 112A. In general, node monitoring service 120 may store node information for each compute node, such as compute node 112A, in global node inventory 122, such as shown in the example of FIG. 2 and described in further detail below.

After storing the at least one address of compute node 112A in global node inventory 122, node monitoring service 120 may (e.g., periodically) assess the accessibility of any created compute nodes 112, such as compute node 112A. For example, node monitoring service 120 may determine the accessibility of one or more of compute nodes 112 each time client devices 138 send a request to web services 104 to provide a status or listing (e.g., a graphical listing within a graphical user interface) of one or more of compute nodes 112, and/or each time controller node 102 attempts to access or update one or more of compute nodes 112. In some cases, node monitoring service 120 may periodically determine the accessibility of compute nodes 112 based on a predetermined timer (e.g., every one or two minutes). As one example, node monitoring service 120 may determine the accessibility of compute nodes 112 through attempted access of these nodes using their respective one or more addresses that are stored in global node inventory 122.

In some instances, one or more of compute nodes 112 may become temporarily unavailable. For instance, a user may temporarily stop execution of one or more of compute nodes 112 (e.g., based on input from client devices 138), but may, at a later point in time, resume execution of these compute nodes. Upon determining that a particular compute node is not accessible at a given time using the at least one address stored in global node inventory 122, node monitoring service 120 may take certain actions. For example, upon determining that compute node 112A is no longer accessible using one or more of its currently assigned addresses, as stored in global node inventory 122, node monitoring service 120 may determine, based on information received from the particular data center that provides or executes compute node 112A, that compute node 112A is still available for execution on that particular data center. For instance, if compute node 112A was previously created for deployment on data center 132A, data center 132A may provide information to node monitor service 120 (e.g., based on a request from node monitor service 120) that compute node 112A is still available for execution on data center 132A, as will be described in further detail below.

Node monitoring service 120 may also receive, from data center 132A, at least one updated address assigned to compute node 112A. For instance, in various cases, if execution of compute node 112A was previously stopped but has now been re-started on data center 132A, data center 132A may provide, to node monitoring service 120, one or more updated addresses (e.g., external and/or local IP addresses) that have been assigned to compute node 112A. Node monitoring service 120 may then store these updated addresses in global node inventory 122, as described in further detail below. In certain cases, further responsive to initially determining that compute node 112A is not accessible using the at least one originally stored address, controller node 102 may refrain (e.g., using web services 104) temporarily from processing any requests received from client devices 138 to access compute node 112A until node monitor service 120 has received the at least one updated address assigned to compute node 112A and updated global node inventory 122 to store the at least one updated address.

FIG. 2 is a block diagram illustrating an example of a node inventory data store 222 that includes node information for one or more compute nodes, in accordance with one or more techniques of the disclosure. For example, as shown in FIG. 2, node inventory 222 includes node information 250A-250P (hereinafter, "node information 250"). Node inventory 222 is one example of global node inventory 122 shown in FIG. 1. Each of node information 250 may include information for a respective compute node that has been deployed within a distributed computing system, such as system 100 shown in FIG. 1. For instance, node information 250A may include information in node inventory 222 for a first compute node (e.g., compute node 112A shown in FIG. 1), and node information 250P may include information for a second compute node (e.g., a second compute node in compute nodes 112).

FIG. 2 illustrates further example details of node information 250A. Any of other node information 250B-250P may be similar to node information 250A. As shown, node information 250A includes IP address information 252, a node identifier 254, status information 256, a data center identifier 258, and a region identifier 260. If node information 250A includes information for compute node 112A shown in FIG. 1, IP address information 252 may include one or more IP addresses that are currently assigned to compute node 112A. For instance, if compute node 112A is deployed and executed on data center 132A on FIG. 1, compute node 112A may have an external IP address and/or a local IP address that have been assigned (e.g., by data center 132A) to compute node 112A. IP address information 252 may include one or both of these addresses.

Node identifier 254 may comprise a unique identifier that is assigned to compute node 112A. In various examples, controller node 102 may have the responsibility of assigning unique node identifiers to each compute node that is deployed within system 100. For example, compute services 106 may assign these unique node identifiers when compute nodes are deployed in response to receiving corresponding resource requests from client devices 138. In some cases, each unique node identifier may comprise an alphanumeric sequence of characters. Node identifier 254 of node information 250A may comprise the unique node identifier of corresponding compute node 112A.

Status information 256 may include the current status information for compute node 112A. For example, when compute node 112A is initially deployed for execution, and is currently online or otherwise available, status information 256 may indicate a status of "online" or "available." However, if compute node 112A is later stopped or taken offline by a user (e.g., via a request from client devices 138), status information 256 may indicate a status of "offline" or "unavailable."

Node information 250A further includes a data center identifier 258. Data center identifier 258 is an identifier that uniquely identifies data center 132A on which compute node 113A has been deployed for execution. By including data center identifier 258 in node information 250A, node monitoring service 120 is capable of identifying the data center on which each compute node has been deployed for execution. Node monitoring service 120 may use data center identifier 258 to determine which data center it should communicate with in further determining whether compute node 112A continues to be accessible via IP address information 252. As indicated above in reference to FIG. 1, node monitoring service 120 may send periodic connectivity detection messages (e.g., "ping" messages) to data center 132A to determine if compute node 112A is still available for execution. Node monitoring service 120 may identify data center 132A using data center identifier 258. In various examples, data center identifier 258 may comprise an alphanumeric sequence of characters, assigned by controller node 102 (e.g., by network services 110 or compute services 106), to uniquely identify data center 132A.

FIG. 2 also shows that, in some optional examples, node information 250A may also include a region identifier 260. Region identifier 260 may provide further location or region information associated with the data center on which compute node 112A has been deployed. For example, data center identifier 258 may identify data center 132A. Region identifier 260 may further indicate the specific region or location of data center 132A (e.g., west region, central region, country/state/city region) in which compute node 112A has been deployed for execution.

Figure 3A:
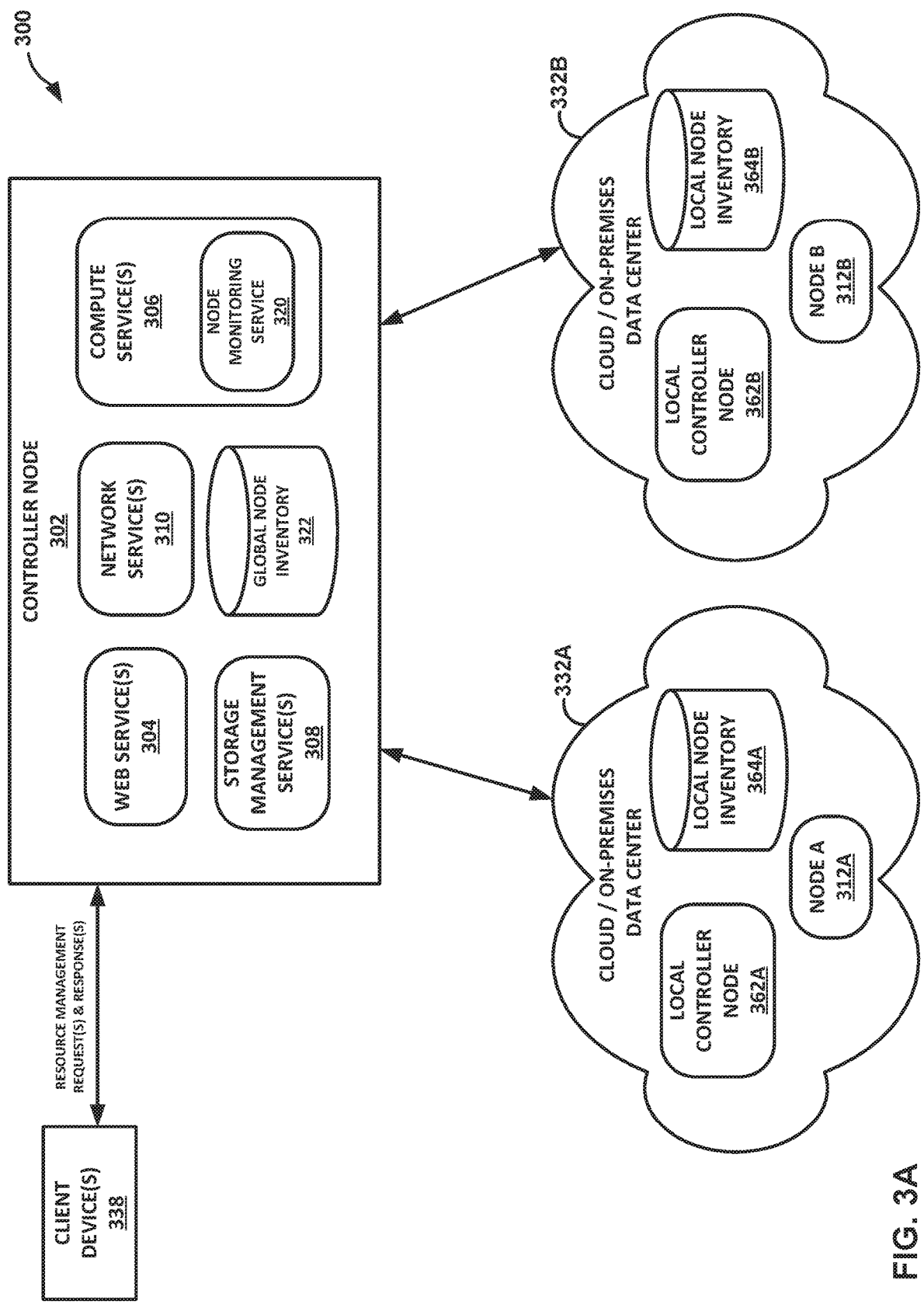
FIGS. 3A-3C are block diagrams illustrating examples of compute nodes that are provided by a group of data centers, in accordance with one or more techniques of the disclosure.
Figure 3B:
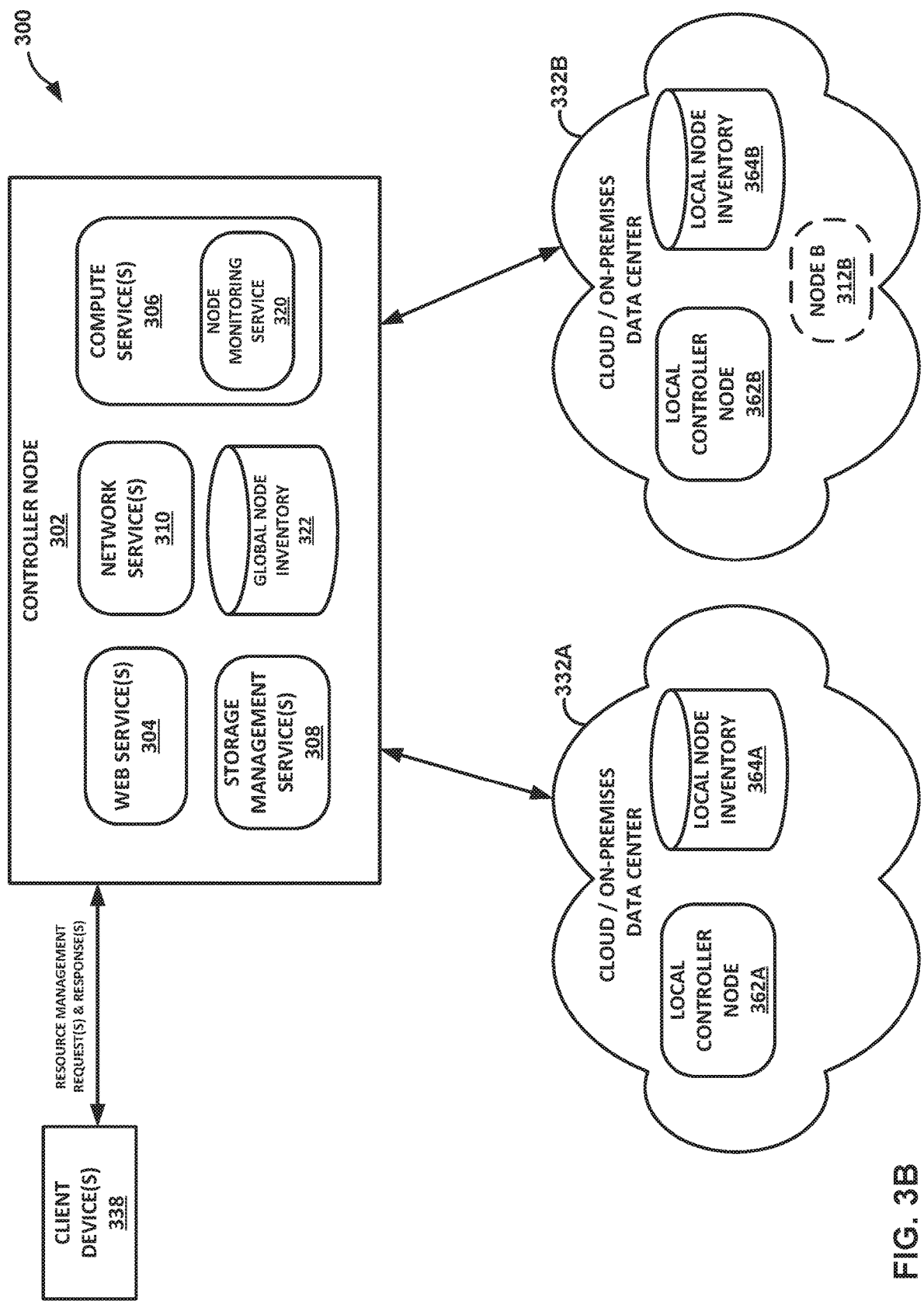
Figure 3C:
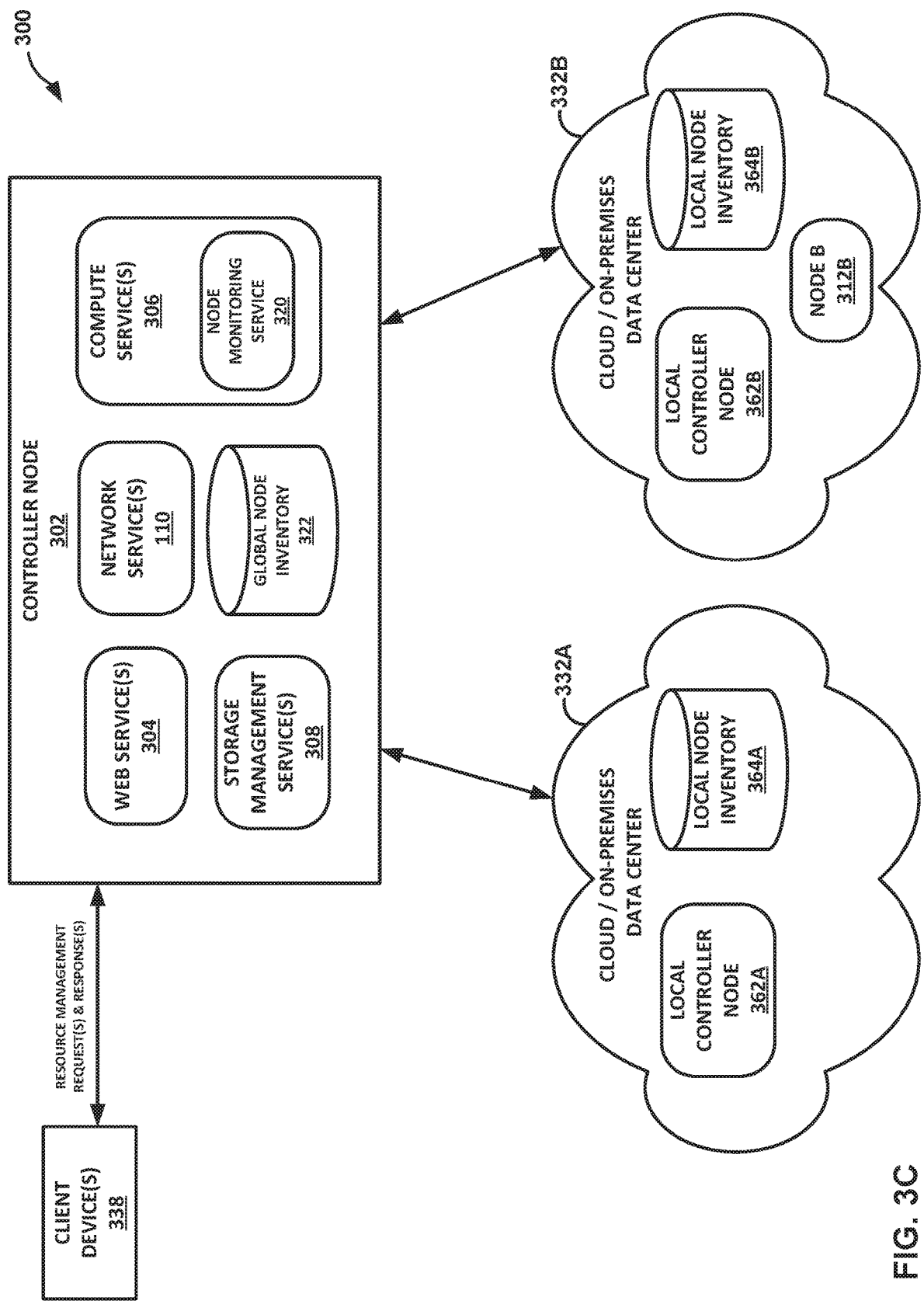

FIGS. 3A-3C are block diagrams illustrating examples of compute nodes that are provided by a group of data centers, in accordance with one or more techniques of the disclosure. FIGS. 3A-3C illustrate examples of a controller node 302 dynamically updating the address information for these nodes within global node inventory 322 as the nodes change status over time.

The components illustrated in FIGS. 3A-3C may be examples of similarly numbered components illustrated in FIG. 1. For instance, in distributed system 300, client devices 338 may be one example of client devices 138 of FIG. 1; controller node 302 may be one example of controller node 102; and data centers 332 may be one example of data centers 132.

Similar to controller node 102, controller node 302 includes one or more web services 304, one or more network services 310, one or more compute services 306, one or more storage management services 308, and global node inventory 322. Controller node 102 may receive resource management requests from, and provide corresponding responses to, client devices 338.

System 300 includes various data centers. In the example of FIGS. 3A-3C, system 300 includes a first cloud or on-premises data center 332A and a second cloud or on-premises data center 332B. Each of data centers 332A and 332B are communicatively coupled to controller node 302. Over time, based on requests received from client devices 338, compute services 306 of controller node 302 may execute various compute nodes for deployment and execution on data centers 332A and/or 332B.

In FIG. 3A, it is assumed that compute services 306 has previously received requests from client devices 338 to deploy a first compute node 312A ("NODE A") on data center 332A and a second compute node 312B ("NODE B") on data center 332B. For instance, at a first point in time, web services 304 may have received a request from one of client devices 338 to create and deploy compute node 312A. Web services 304 may forward this request to compute services 306, which may then select a particular data center in distributed computing system 300 for deploying compute node 312A. In some cases, compute services 306 may select data center 332A for deploying compute node 312A based upon input from client devices 338 (e.g., based on identification of data center 332A in the resource management request received from client devices 338). In other cases, compute services 306 may dynamically select data center 332A based upon state information (e.g., information associated with the requested compute node 312A, information associated with current network/bandwidth/processing conditions associated with system 300 and/or data centers 332A/332B). Compute services 306 may store the unique data center identifier (e.g., data center identifier 258) for data center 332A within the node information for requested compute node 312A within global node inventory 322. In some cases, compute services 306 may also store a region identifier (e.g., region identifier 260) within the node information for compute node 312A, where the region identifier specifies a particular region of data center 332A in which compute node 312A is to be deployed for execution.

After selecting data center 332A for deployment of requested compute node 312A, compute services 306 may assign a unique node identifier for requested compute node 312A, and may store this node identifier within the node information for requested compute node 312A in global node inventory 322. Global node inventory 322 may be one example of node inventory 222 shown in FIG. 2, and the stored node identifier may be one example of node identifier 254 of node information 250A.

Compute services 306 may deploy compute node on data center 332A. To do so, compute services 306 may send a request to execute compute node 312A on data center 332A for use by client devices 338, where the request includes the assigned node identifier for requested compute node 312A. In some cases, compute services 306 of controller node 302 may send this request to a local controller node 362A that is executed on data center 332A. Controller node 302 may be a global controller node that may communicate with any data center in system 300, while local controller node 362A is local to data center 332A. Local controller node 362A may provide functionality that is similar to controller node 302, but on a localized level with respect to data center 332A. (Data center 332B includes a similar local controller node 362B that is local to data center 332B.)

After sending this deployment request for compute node 312A to local controller node 362A, local controller node 362A may deploy compute node 312A on data center 332A for execution. Local controller node 362A may assign one or more addresses to compute node 312A (e.g., one or more IP addresses, such as an external IP address and an local IP address), and store these addresses, along with the assigned node identifier, as node information for compute node 312A in local node inventory 364A. Local node inventory 364A may be similar to global node inventory 322, but localized in scope to compute nodes, such as compute node 312A, that are deployed on data center 332A. Local node inventory 364A may be one example of node inventory 222 shown in FIG. 2, and the node information for compute node 312A may be one example of node information 250A, which includes node identifier 254.

Local controller node 362A may also send the one or more addresses assigned to compute node 312A to compute services 306 of controller node 302. For example, compute services 306 may receive an external IP address and a local IP address that are assigned to compute node 312A. Compute services 306 may also store this address information as node information for compute node 312A within global node inventory 322, which, as noted above, may be one example of node inventory 222 shown in FIG. 2.

In a similar fashion, controller node 302 may receive a request from client devices 338 to deploy a second compute node 312B. In the example of FIG. 3A, compute node 312B has been deployed on data center 332B. Data center 332B includes local controller node 362B and local node inventory 364B.

At a later point in time, as shown in FIG. 3B, the state of compute nodes deployed on data centers 332A and 332B may have changed. For example, as illustrated, compute node 312A has been deleted or removed, and compute node 312B has been temporarily disabled or taken offline, as indicated in FIG. 3B. The status of these compute nodes may change based upon changing conditions within the network or data centers 332A/332B (e.g., bandwidth/availability issues affecting the network or data centers 332A/332B), and/or based upon explicit instructions from one or more users, such as users of client devices 338 or other devices communicatively coupled to data centers 332A/332B. For instance, a user may have requested deletion of compute node 312A from data center 332A. The same or another user may have also requested that compute node 312B be temporarily disabled or taken offline in data center 332B. In various examples, web services 304 may refrain from processing or otherwise handling any requests (e.g., requests from client devices 338) associated with compute node 312B while it is in such an offline mode.

At a subsequent time, such as shown in FIG. 3C, the status of compute node 332B may once again change, such that it is once again online within data center 332B. The status of compute node 332B may have changed based upon changing conditions within the network or data center 332B (e.g., bandwidth/availability issues affecting the network or data center 332B), and/or based upon explicit instructions from one or more users to reenable to place compute node 312B back online within data center 332B. In some cases, the addresses previously assigned to compute node 312B may remain the same. However, in various cases, local controller node 362B may assign one or more new or updated addresses (e.g., one or more IP addresses) to compute node 312B once it has been re-enabled or placed back online for execution on data center 332B. Local controller node 362B may store these updated addresses in local node inventory 364B.

In various examples, node monitoring service 320 is configured to determine, over multiple repeated iterations, whether compute node 312B is still accessible using the at least one address for compute node 312B currently stored in global node inventory 322. For example, node monitoring service 320 may be configured to send periodic connectivity detection messages (e.g., "ping" messages) to compute node 312B using the one or more addresses stored in global node inventory 322 for compute node 312B.

In the case in which local controller node 362B has assigned one or more new addresses to compute node 312B once it has been re-enabled or placed back online in data center 332B, node monitoring service may be unable to communicate with compute node 312B using the previously stored addresses stored in global node inventory 322. When node monitoring service 320 attempts to send connectivity detection messages to compute node 312B using the old, previously stored addresses in global node inventory 322, it will fail to receive any replies to these connectivity detection messages, and may therefore initially determine that compute node 312B is not accessible using these previously stored addresses.

Similar to the description above in reference to FIG. 1, in some cases, node monitoring service 120 may attempt to determine the availability of compute nodes, such as compute node 312B, each time client devices 338 send a request to web services 304 to provide a status or listing (e.g., a graphical listing within a graphical user interface) of compute node 312B, and/or each time controller node 302 attempts to access or update compute node 312B. In some cases, node monitoring service 320 may periodically determine the availability of compute node 312B based on a predetermined timer (e.g., every one or two minutes). In some examples, node monitoring service 320 may initiate execution of a first background process to determine whether compute node 312B is accessible, and store, in global node inventory 322, an indication of that node 312B is not accessible. For instance, when global node inventory 322 is an example of node inventory 222 shown in FIG. 2, node monitoring service 320 may store this status indication within status field 256.

However, after determining that compute node 312B is not accessible using the previously stored address information in global node inventory 322, node monitoring service 320 may nevertheless determine, based on information received from local controller node 362B of data center 332B, that compute node 312B is still available for execution on data center 332B. For example, node monitoring service 320 may receive, from local controller node 362B of data center 332B, at least one updated address that is assigned to compute node 312B and stored in local node inventory 364B of data center 332B. Upon receiving the at least one updated address, node monitoring service 320 may update the node information for compute node 312B that is stored in global node inventory 322 to include the at least one updated address that is assigned to compute node 312B. In certain examples, node monitoring service 320 may determine that compute node 312B is still available for execution on data center 332B, receive the at least one updated address from local controller node 362B, and update global node inventory 322 to store the at least one updated address using a second background process.

As described above in reference to FIG. 3A, when node monitoring service 320 initially deployed compute node 312B for execution on data center 332B, it assigned a unique node identifier for compute node 312B and stored this identifier in global node inventory 322 within the node information for compute node 312B. In some examples, when node monitoring service 320 attempts to periodically determine, based on information received from local controller node 362B, whether or not compute node 312B is still available for execution on data center 332B, node monitoring service 320 may first send, to local controller node 362B via an application programming interface (API), the unique node identifier that is assigned to compute node 312B. In some cases, node monitoring service 320 may also send, to local controller node 362B via the API, a region identifier (e.g., region identifier 260 shown in FIG. 2) that is associated with the node information for compute node 312B in global node inventory 322. The region identifier may specify a particular region of data center 332B in which compute node 312B was deployed.

Local controller node 362B may then access the node information it has stored for compute node 312B in local node inventory 364B using the unique node identifier for compute node 312B, which it previously received from controller node 302 and stored in local node inventory 364B when first deploying compute node 312B. Local controller node 362B may identify the status (e.g., status 256) and the one or more addresses (e.g., IP address information 252), within the node information for compute node 312B within local node inventory 364B, based on the node identifier (e.g., node identifier 254) for compute node 312B. Local controller node 362B may then provide the status and the one or more addresses back to node monitoring service 320 using the API. The status indicates that compute node 312B is still available for execution on data center 332B.

As described earlier, the one or more addresses originally assigned to compute node 312B in FIG. 3A, and initially stored in global node inventory 322 within the node information for compute node 312B, may include an external IP address and a local IP address. In various examples, node monitoring service 320 determines, in FIG. 3C, that compute node 312B is not accessible using either of external or local IP addresses that were initially stored within global node inventory 322. In these examples, responsive to sending the node identifier (and, in some cases, the region identifier) of compute node 312B to local controller node 362B, node monitoring service 320 receives from local controller node 362B an updated external IP address that has been assigned to compute node 312B. Node monitoring service 320 then updates global node inventory 322 to store this updated external IP address for compute node 312B.

In other examples, node monitoring service 320 determines, in FIG. 3C, that compute node 312B is not accessible using first just the local IP address. In these examples, node monitoring service 320 determines that compute node 312B is still available for execution on data center 332B by determining, based on one or more communications received from compute node 312B using the external IP address, that compute node 312B is accessible using the external IP address. Node monitoring service 320 then receives an updated local IP address from compute node 312B, and updates global node inventory 322 to store the updated local IP address assigned to compute node 312B.

Figure 4:
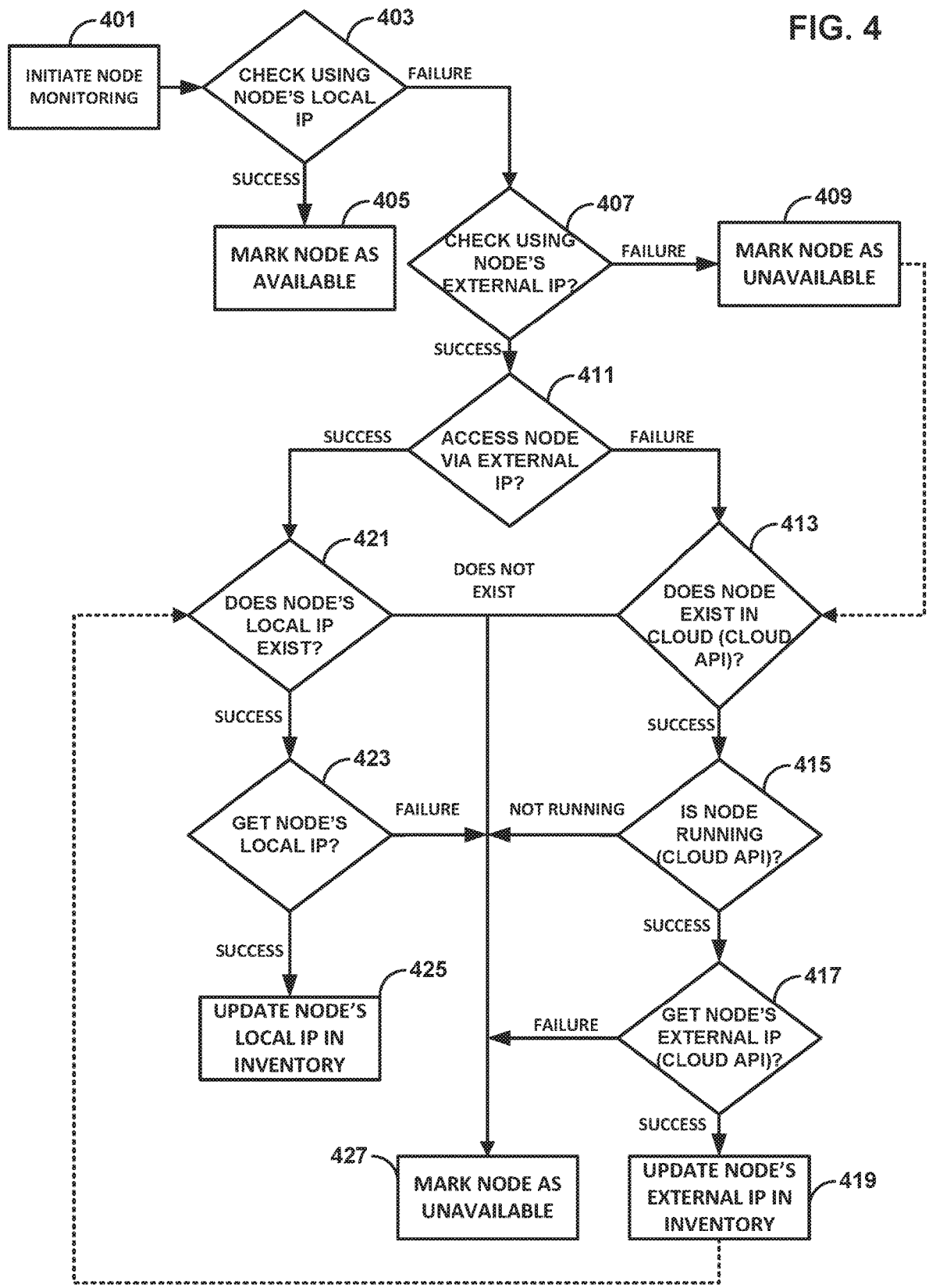
FIG. 4 is a flow diagram illustrating an example process to update one or more addresses that are assigned to a compute node within a node inventory data store, in accordance with one or more techniques of the disclosure.

FIG. 4 is a flow diagram illustrating an example process to update one or more addresses that are assigned to a compute node within a node inventory data store, in accordance with one or more techniques of the disclosure. For example, the process of FIG. 4 may be used to update global node inventory 322 shown in FIGS. 3A-3C. For purposes of illustration only, the process of FIG. 4 will be described in reference to FIGS. 3A-3C.

As shown in FIG. 4, node monitoring service 320 may initiate (401) the node monitoring process. In this example, it is assumed that compute node 312B illustrated in FIG. 3 has been previously deployed for execution on data center 332B, and that compute node 312B has both an external IP address and a local IP address that are stored both in local node inventory 364B and global node inventory 322. However, if compute node 312B is temporarily disabled or taken offline, and then subsequently re-enabled or placed back online, local controller node 362B may, in certain cases, update or assign new external and/or local IP addresses for compute node 312B, which it then stores in its local node inventory 364B.

Node monitoring service 320 may attempt to check (403) the connectivity to compute node 312B, such as by sending connectivity detection messages (e.g., "ping" messages) using the local IP address for compute node 312B that is stored in global node inventory 322 of controller node 302 (e.g., within IP address information 252 of node information 250A for compute node 312B, as shown in FIG. 2). In certain examples, a local IP address for compute node 312B may be set up in a virtual bridge interface (e.g., "br0") for controller node 302 in order to access compute node 312B via its local IP address. In these examples, node monitoring service 320 may attempt to check the connectivity to compute node 312B using this virtual bridge interface that is configured to use the local IP address.

If the local IP address of compute node 312B has not changed, and if node monitoring service 320 is able to successfully check and detect connectivity to compute node 312B using the local IP address stored in global node inventory 322, node monitoring service 320 may mark (405) the status of compute node 312B as available in global node inventory 322 (e.g., within status field 256 for node information 250A of compute node 312B).

However, if node monitoring service 320 is unable to successfully detect connectivity to compute node 312B using the local IP address (e.g., by way of one or more "ping" messages), node monitoring service may then attempt to check (407) connectivity to compute node 312B using the external IP address for compute node 312B that is stored in global node inventory 322. If node monitoring service 320 fails to receive a response to one or more of the connectivity detection messages (e.g., "ping" messages) using the stored external IP address in global node inventory 322, node monitoring service 320 may mark (409) the status of compute node 312B as unavailable in global node inventory 322.

If, on the other hand, node monitoring service 320 successfully receives a response to one or more of the connectivity detection messages using the stored external IP address in global node inventory 322, node monitoring service 320 may attempt to access (411) compute node 312B using the stored external IP address. With this check, node monitoring service 320 attempts to determine whether compute node 312B, as opposed to another entity or node, is accessible via the stored external IP address. For instance, node monitoring service 320 may attempt to send test data to and receive response data back from compute node 312B, to ensure that compute node 312B is accessible via the external IP address.

If node monitoring service 320 fails to access compute node 312B using the previously stored external IP address, node monitoring service 320 initiates the process to obtain an updated external IP address for compute node 312B that may be stored in local node inventory 364B. Node monitoring service 320 may first check (413) to determine if compute node 312B still exists in the cloud on data center 332B using a cloud API call, such as described earlier in reference to FIG. 3C. In some cases, node monitoring service 320 may also check (413) to determine if compute node 312B still exists on data center 332B after failing to receive a response to one or more of the connectivity detection messages using the external IP address of compute node 312B and marking (409) the status of compute node 312B as unavailable.

For example, node monitoring service 320 may send the uniquely assigned node identifier of compute node 312B to local controller node 362B of data center 332B via this API. Upon receiving the node identifier, local controller node 362B may check its local node inventory 364B to see if any node information still exists for node 312B having this node identifier. If local controller node 362B is unable to locate any node information for a compute node having this node identifier (e.g., if compute node 312B had been deleted), local controller node 362B would send a response back to node monitoring service 320 indicating that compute node 312B no longer exists. In this case, node monitoring service 320 may mark (427) the status of compute node 312B in global node inventory 322 as unavailable.

However, if local controller node 362B is able to locate node information for compute node 312B in local node inventory 364B having the identified node identifier, local controller node 362B sends a response to node monitoring service 320 indicating that compute node 312B does exist. Node monitoring service 320 may then check (415) if compute node 312B is running, or executing, on data center 332B. In some cases, node monitoring service 320 may determine whether or not compute node 312B is running based on the initial response received from local controller node 362B via the API, in which case local controller node 362B may specify both whether or not compute node 312B exists and/or is running. In other cases, node monitoring service 320 may send a second request to local controller node 362B via the API, where the request includes the node identifier of compute node 312B, and local controller node 362B may send a corresponding response indicating whether or not compute node 312B is running on data center 332B.

If node monitoring service 320 receives information from local controller node 362B via the API that compute node 312B is not running, node monitoring service 320 will mark (427) the status of node 312B in global node inventory 322 as unavailable. If, on the other hand, node monitoring service 320 receives information from local controller node 362B indicating that compute node 312B is running on data center 332B, node monitoring service 320 then will attempt to get (417) the currently assigned external IP address for compute node 312B via the API with local controller node 362B. In some cases, node monitoring service 320 may attempt to receive this external IP address in the initial response received from local controller node 362B via the API. In other cases, node monitoring service 320 may send a separate request to local controller node 362B via the API, where the request includes the node identifier of compute node 312B, and local controller node 362B may send a corresponding response indicating the external IP address of compute node 312B. This external IP address may be the most recently address assigned by local controller node 362B that is stored in local node inventory 364B of data center 332B.

If node monitoring service 320 fails to obtain an updated external IP address for compute node 312B from local controller node 362B via the API, node monitoring service 320 will mark (427) the status of compute node 312B in global node inventory 322 as unavailable. If, however, node monitoring service 320 successfully obtains this updated external IP address, node monitoring service 320 updates (419) global node inventory 322 to include the updated external IP address within the node information for compute node 312B.

In some situations, after updating global node inventory 322, node monitoring service 320 may also attempt to determine (421) if the local IP address of compute node 312B exists. In addition, if node monitoring service had previously been able to successfully access (411) compute node 312B via its previously stored external IP address in global node inventory 322, node monitoring service 320 utilizes the external IP address to access compute node 312B and also then attempts to determine (421) if the local IP address of compute node 312B exists. In certain examples, a local IP address for compute node 312B may be set up in a virtual bridge interface (e.g., "br0") for controller node 302 in order to access compute node 312B via its local IP address. In these examples, node monitoring service 320 may attempt to determine if the local IP address for compute node 312B exists by determining whether the corresponding virtual bridge interface to compute node 312B, configured with the local IP address, exists.

If node monitoring service 320 determines that the local IP address for compute node 312B does not exist or is not properly set up, node monitoring service 320 may mark (427) the status of compute node 312B in global node inventory 322 as unavailable. If, however, the local IP address of compute node 312B does exist, node monitoring service 320 is able to access compute node 312B via its external IP address to get (423) the updated local IP address of compute node 312B, which may be stored in local node inventory 364B of data center 332B. If node monitoring service 320 is able to successfully obtain this updated local IP address of compute node 312B, it updates (425) global node inventory 322 to store this updated local IP address. If, however, node monitoring service 320 is unable to obtain the local IP address for compute node 312B, it marks (427) the status of compute node 312B in global node inventory 322 as unavailable.

In some examples, the process illustrated in FIG. 4 may be executed by controller node 302 (e.g., node monitoring service 320) as one or more processes. For instance, in certain cases, a first process (e.g., first background process) may perform the operations 403 and/or 407 of FIG. 4 to determine the current availability status of compute node 312B using the local and/or external IP address currently stored in global node inventory 322. In these cases, a second process (e.g., second background process) may perform the additional operations of FIG. 4. In addition, while FIG. 4 has been described in reference to compute node 312B, node monitoring service 320 may perform the process illustrated in FIG. 4 for any one or more of compute nodes within the distributed computing system.

Figure 5:
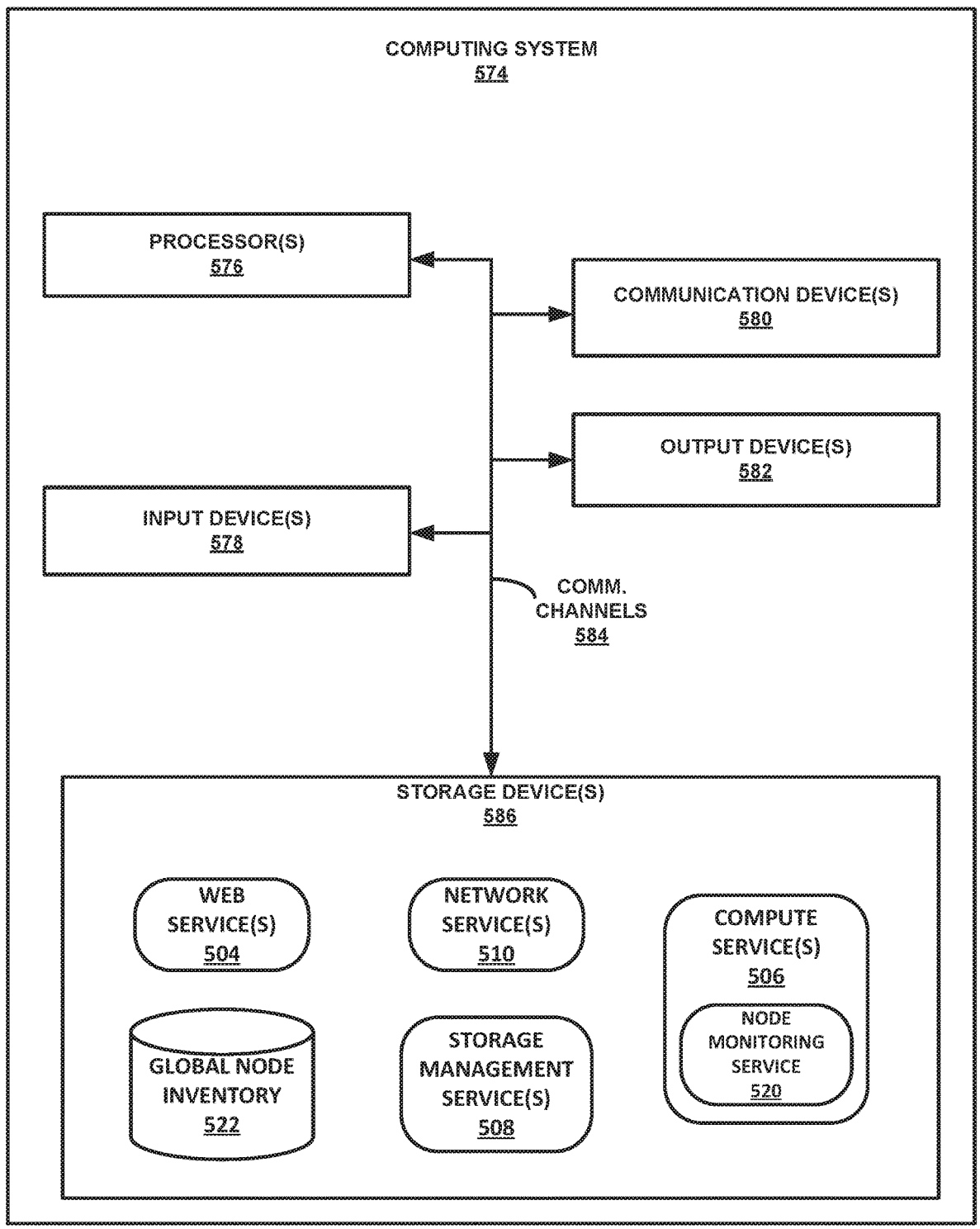
FIG. 5 is a block diagram illustrating an example computing system, in accordance with one or more techniques of the disclosure.

FIG. 5 is a block diagram illustrating an example computing system 574, in accordance with one or more techniques of the disclosure. Computing system 474 may include or implement one or more of the nodes or services described herein and shown in FIGS. 1 and/or 3A-3C. FIG. 5 illustrates only one particular example of computing system 574, and many other examples of computing system 574 may be used in other instances and may include a subset of the components shown, or may include additional components not shown, in FIG. 5.

As shown in the example of FIG. 5, computing system 574 includes one or more processors 576, one or more input devices 578, one or more communication devices 580, one or more output devices 582, and one or more storage devices 586. In some examples, computing system 574 may not include input devices 578 and/or output devices 582. Communication channels 584 may interconnect each of the components 576, 580, 578, 582, and 586 for inter-component communications (physically, communicatively, and/or operatively). In some examples, communication channels 584 may include a system bus, a network connection, an inter-process communication data structure, or any other method for communicating data between hardware and/or software.

One or more input devices 578 of computing system 574 may receive input. Examples of input are tactile, audio, and video input. Examples of input devices 578 include a presence-sensitive screen, touch-sensitive screen, mouse, keyboard, voice responsive system, video camera, microphone or any other type of device for detecting input from a human or machine.

One or more output devices 582 of computing system 574 may generate output. Examples of output are tactile, audio, and video output. Examples of output devices 582 include a presence-sensitive screen, sound card, video graphics adapter card, speaker, cathode ray tube (CRT) monitor, liquid crystal display (LCD), or any other type of device for generating output to a human or machine. Output devices 582 may include display devices such as cathode ray tube (CRT) monitor, liquid crystal display (LCD), or any other type of device for generating tactile, audio, and/or visual output.

One or more communication devices 580 of computing system 574 may communicate with one or more other computing systems or devices via one or more networks by transmitting and/or receiving network signals on the one or more networks. Examples of communication devices 580 include a network interface card (e.g. such as an Ethernet card), an optical transceiver, a radio frequency transceiver, or any other type of device that can send and/or receive information, such as through a wired or wireless network. Other examples of communication devices 580 may include short wave radios, cellular data radios, wireless Ethernet network radios, as well as universal serial bus (USB) controllers.

One or more storage devices 586 within computing system 574 may store information for processing during operation of computing system 574 (e.g., computing system 574 may store data accessed by one or more modules, processes, applications, services, nodes, application containers, or the like during execution at computing system 574). In some examples, storage devices 586 on computing system 574 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art. In some cases, storage devices 586 may include redundant array of independent disks (RAID) configurations and one or more solid-state drives (SSD's).

Storage devices 586, in some examples, also include one or more computer-readable storage media. Storage devices 586 may be configured to store larger amounts of information than volatile memory. Storage devices 586 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 586 may store program instructions and/or data associated with one or more software/firmware elements or modules.

For example, storage devices 586 may store various modules, applications, and/or services, such as web services 504, network services 510, storage management services 508, and compute services 506, including node monitoring service 520. The components stored in storage devices 586 may be examples of similarly named components shown in FIG. 1 and FIGS. 3A-3C. Storage devices 586 further includes global node inventory 522.

Computing system 574 further includes one or more processors 576 that may implement functionality and/or execute instructions within computing system 574. For example, processors 576 may receive and execute instructions stored by storage devices 586 that execute the functionality of the elements and/or modules described herein. These instructions executed by processors 576 may cause computing system 574 to store information within storage devices 586 during program execution. Processors 576 may also execute instructions of an operating system to perform one or more operations described herein.

Figure 6:
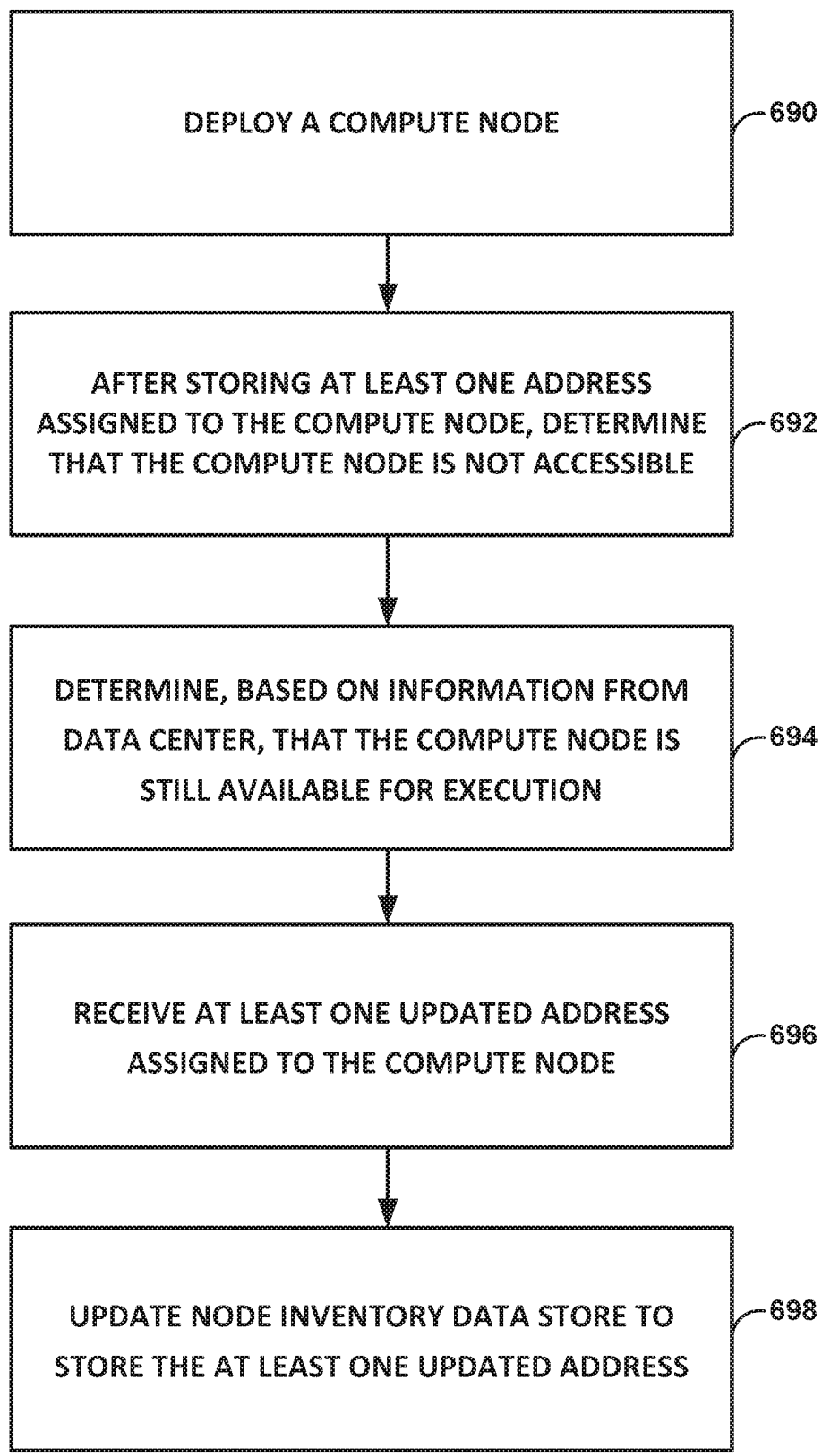
FIG. 6 is a flow diagram illustrating another example process to update one or more addresses that are assigned to a compute node within a node inventory data store, in accordance with one or more techniques of the disclosure.

FIG. 6 is a flow diagram illustrating another example process to update one or more addresses that are assigned to a compute node within a node inventory data store, in accordance with one or more techniques of the disclosure. The example process illustrated in FIG. 6 may be performed by one or more computing systems, such as computing system 574 illustrated in FIG. 5 that may include or implement one or more of the nodes or services described herein and shown in FIGS. 1 and/or 3A-3C.

As shown in the example of FIG. 6, the example process includes, responsive to receiving a resource request from a client device (e.g., client device 138), deploying (690), by a controller node executed by one or more processors (e.g., controller node 102), and for execution on a particular data center selected from a plurality of different data centers (e.g., data centers 132) within a distributed computing system (e.g., system 100), a compute node (e.g., one of compute nodes 112), and storing, by the controller node and in a node inventory data store (e.g., global node inventory 322), at least one address that is assigned to the compute node. The example process further includes, after storing the at least one address, determining (692) that the compute node is not accessible using the at least one address, and, responsive to making this determination (e.g., by node monitoring service 120 of controller node 102), determining (694), by the controller node and based on information received from the particular data center, that the compute node is still available for execution on the particular data center.

The example process of FIG. 6 further includes receiving (696), by the controller node and from the particular data center, at least one updated address assigned to the compute node, and updating (698), by the controller node, the node inventory data store to store the at least one updated address that is assigned to the compute node.

Example 1: A method comprising: responsive to receiving a resource request from a client device, deploying, by a controller node executed by one or more processors, and for execution on a particular data center selected from a plurality of data centers within a distributed computing system, a compute node; storing, by the controller node and in a node inventory data store, at least one address assigned to the compute node; and after storing the at least one address, and responsive to determining that the compute node is not accessible using the at least one address: determining, by the controller node and based on information received from the particular data center, that the compute node is still available for execution on the particular data center; receiving, by the controller node and from the particular data center, at least one updated address assigned to the compute node; and updating, by the controller node, the node inventory data store to store the at least one updated address assigned to the compute node.

Example 2: The method of Example 1, further comprising: after receiving the resource request from the client device, selecting, by the controller node, the particular data center from the plurality of different data centers in the distributed computing system; receiving, by the controller node and from the particular data center, the at least one address assigned to the compute node; and after storing the at least one address, determining, by the controller node and over multiple repeated iterations, whether the compute node is still accessible using the at least one address.

Example 3: The method of Example 2, wherein determining, over the multiple repeated iterations, whether the compute node is still accessible using the at least one address comprises sending, by the controller node and to the compute node using the at least one address, periodic messages, and wherein determining that the compute node is not accessible using the at least one address comprises determining that the controller node failed to receive one or more replies in response to the periodic messages.

Example 4: The method of Example 2, wherein determining, over the multiple repeated iterations, whether the compute node is still accessible using the at least one address comprises: responsive to receiving a request from either the client device or controller node to access information associated with the compute node, initiating, by the controller node, execution of a first background process to determine whether the node is accessible; and storing, by the background process executed by the controller node, and in the node inventory data store, an indication of whether the node is accessible, wherein determining that the compute node is still available for execution on the particular data center, receiving the at least one updated address assigned to the compute node, and updating the node inventory data store to store the at least one updated address are performed by a second background process executed by the controller node.

Example 5: The method of any of Examples 1-4, further comprising: assigning, by the controller node, a unique node identifier to the compute node; wherein determining, based on the information received from the particular data center, that the compute node is still available for execution on the particular data center comprises: sending, by the controller node and to particular data center, the unique node identifier assigned to the compute node; and receiving, by the controller, the information from the particular data center, wherein the information indicates that the compute node is still available for execution on the particular data center.

Example 6: The method of Example 5, wherein the at least one address that is assigned to the compute node includes an external Internet Protocol (IP) address and a local IP address, wherein determining that the compute node is not accessible using the at least one address comprises determining, by the controller node, that the compute node is not accessible using either the local IP address or the external IP address, wherein receiving the at least one updated address assigned to the compute node comprises receiving, by the controller node and from the particular data center, an updated external IP address assigned to the compute node, and wherein updating the node inventory data store comprises updating, by the controller node, the node inventory data store to store the updated external IP address assigned to the compute node.

Example 7: The method of any of Examples 1-6, wherein the at least one address that is assigned to the compute node includes an external Internet Protocol (IP) address and a local IP address, wherein determining that the compute node is not accessible using the at least one address comprises determining, by the controller node, that the compute node is not accessible using the local IP address, wherein determining, based on the information received from the particular data center, that the compute node is still available for execution on the particular data center comprises determining, by the controller node and based on one or more communications received from the compute node using the external IP address, that compute node is accessible using the external IP address, wherein receiving the at least one updated address assigned to the compute node comprises receiving, by the controller node and from the compute node, an updated local IP address assigned to the compute node, and wherein updating the node inventory data store comprises updating, by the controller node, the node inventory data store to store the updated local IP address assigned to the compute node.

Example 8: The method of any of Examples 1-7, wherein the node inventory data store includes node information associated with the compute node, and wherein the node information includes the at least one updated address assigned to the compute node, a unique node identifier of the compute node, status information indicating a current availability status associated with the compute node, and data center information indicating the particular data center associated with the compute node.

Example 9: The method of any of Examples 1-8, further comprising: further responsive to determining that the compute node is not accessible using the at least one address, temporarily refraining, by the controller node, from processing any requests received from the client device to access the compute node until the controller node has received the at least one updated address assigned to the compute node and updated the node inventory data store to store the at least one updated address.

Example 10: The method of any of Examples 1-9, wherein deploying the compute node comprises sending, by the controller node and to the particular data center, a request to execute the compute node on the particular data center for use by the client device.

Example 11: A computing system, comprising: one or more processors; and at least one computer-readable storage medium storing instructions that, when executed, cause the one or more processors to: responsive to receiving a resource request from a client device, deploy, by a controller node, and for execution on a particular data center selected from a plurality of data centers within a distributed computing system, a compute node; store, by the controller node and in a node inventory data store, at least one address assigned to the compute node; and after storing the at least one address, and responsive to determining that the compute node is not accessible using the at least one address: determine, by the controller node and based on information received from the particular data center, that the compute node is still available for execution on the particular data center; receive, by the controller node and from the particular data center, at least one updated address assigned to the compute node; and update, by the controller node, the node inventory data store to store the at least one updated address assigned to the compute node.

Example 12: The computing system of Example 11, wherein the instructions stored by the at least one computer-readable storage medium, when executed, cause the one or more processors to perform the method of any of Examples 2-10.

Example 13: A computing system, comprising: one or more processors; and at least one computer-readable storage medium storing instructions that, when executed, cause the one or more processors to perform the method of any of Examples 1-10.

Example 14: A computer system comprising means for performing the method of any of Examples 1-10.

Example 15: A computer-readable storage medium storing instructions that are executable by at least one processor to: responsive to receiving a resource request from a client device, deploy, by a controller node, and for execution on a particular data center selected from a plurality of data centers within a distributed computing system, a compute node; store, by the controller node and in a node inventory data store, at least one address assigned to the compute node; and after storing the at least one address, and responsive to determining that the compute node is not accessible using the at least one address: determine, by the controller node and based on information received from the particular data center, that the compute node is still available for execution on the particular data center; receive, by the controller node and from the particular data center, at least one updated address assigned to the compute node; and update, by the controller node, the node inventory data store to store the at least one updated address assigned to the compute node.

Example 16: The computer-readable storage medium of Examiner 15, wherein the instructions are executable by the at least one processor to perform the method of any of Examples 2-10.

Example 17: A computer-readable storage medium storing instructions that are executable by at least one processor to perform the method of any of Examples 1-10.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

The invention claimed is:

1. A method comprising:
responsive to receiving a resource request from a client device, deploying, by a controller node executed by one or more processors, and for execution on a particular data center selected from a plurality of data centers, a compute node;
storing, by the controller node and in a node inventory data store, first and second Internet Protocol (IP) addresses that are each assigned to the compute node, wherein the first IP address is different than the second IP address;
sending, by the controller node and using the first IP address assigned to the compute node, a first group of one or more connectivity detection messages;
determining, by the controller node, that the compute node is not accessible using the first IP address at least by determining that the controller node failed to receive at least one reply in response to the first group of one or more connectivity detection messages; and responsive to determining that the compute node is not accessible using the first IP address:
sending, by the controller node and using the second IP address assigned to the compute node, a second group of one or more connectivity detection messages;
determining, by the controller node and based on information received from the particular data center, that the compute node is still available for execution on the particular data center;
receiving, by the controller node and from the particular data center, at least one updated IP address assigned to the compute node; and
updating, by the controller node, the node inventory data store to store the at least one updated IP address assigned to the compute node.

2. The method of claim 1, further comprising:
after receiving the resource request from the client device, selecting, by the controller node, the particular data center from the plurality of different data centers;
receiving, by the controller node and from the particular data center, the first and second IP addresses that are each assigned to the compute node; and
after storing the first and second IP addresses, determining, by the controller node and over multiple repeated iterations, whether the compute node is still accessible using the first IP address.

3. The method of claim 2, wherein determining, over the multiple repeated iterations, whether the compute node is still accessible using the first IP address comprises:
responsive to receiving a request from either the client device or t controller node to access information associated with the compute node, initiating, by the controller node, execution of a first background process to determine whether the compute node is accessible; and
storing, by the background process executed by the controller node, and in the node inventory data store, an indication of whether the compute node is accessible,
wherein determining that the compute node is still available for execution on the particular data center, receiving the at least one updated IP address assigned to the compute node, and updating the node inventory data store to store the at least one updated IP address are performed by a second background process executed by the controller node.

4. The method of claim 1, further comprising:
assigning, by the controller node, a unique node identifier to the compute node;
wherein determining, based on the information received from the particular data center, that the compute node is still available for execution on the particular data center comprises:
sending, by the controller node and to particular data center, the unique node identifier assigned to the compute node; and
receiving, by the controller, the information from the particular data center, wherein the information indicates that the compute node is still available for execution on the particular data center.

5. The method of claim 4,
wherein the first IP address assigned to the compute node comprises one of an external IP address gr a local IP address,
wherein the second IP address assigned to the compute node comprises another one of the external IP address or the local IP address,
wherein receiving the at least one updated IP address assigned to the compute node comprises receiving, by the controller node and from the particular data center, an updated external IP address assigned to the compute node, and
wherein updating the node inventory data store comprises updating, by the controller node, the node inventory data store to store the updated external IP address assigned to the compute node.

6. The method of claim 1,
wherein the first IP address assigned to the compute node comprises a local IP address,
wherein the second IP address assigned to the compute node comprises an external IP address,
wherein determining, based on the information received from the particular data center, that the compute node is still available for execution on the particular data center comprises determining, by the controller node and based on one or more communications received from the compute node using the external IP address, that compute node is accessible using the external IP address,
wherein receiving the at least one updated IP address assigned to the compute node comprises receiving, by the controller node and from the compute node, an updated local IP address assigned to the compute node, and
wherein updating the node inventory data store comprises updating, by the controller node, the node inventory data store to store the updated local IP address assigned to the compute node.

7. The method of claim 1,
wherein the node inventory data store includes node information associated with the compute node, and
wherein the node information includes the at least one updated IP address assigned to the compute node, a unique node identifier of the compute node, status information indicating a current availability status associated with the compute node, and data center information indicating the particular data center associated with the compute node.

8. The method of claim 1, further comprising:
further responsive to determining that the compute node is not accessible using the first IP address, temporarily refraining, by the controller node, from processing any requests received from the client device to access the compute node until the controller node has received the at least one updated IP address assigned to the compute node and updated the node inventory data store to store the at least one updated IP address.

9. The method of claim 1, wherein deploying the compute node comprises sending, by the controller node and to the particular data center, a request to execute the compute node on the particular data center for use by the client device.

10. A computing system, comprising:
one or more processors; and
at least one computer-readable storage medium storing instructions that, when executed, cause the one or more processors to:
responsive to receiving a resource request from a client device, deploy, by a controller node, and for execution on a particular data center selected from a plurality of data centers, a compute node;
store, by the controller node and in a node inventory data store, first and second Internet Protocol (IP)

addresses that are each assigned to the compute node, wherein the first IP address is different than the second IP address;

send, by the controller node an using the first IP address assigned to the compute node, a first group of one or more connectivity detection messages;

determine, by the controller node, that the compute node is not accessible using the first IP address at least by determining that the controller node failed to receive at least one reply in response to the first group of one or more connectivity detection messages; and responsive to determining that the compute node is not accessible using the first IP address:

send, by the controller node and using the second IP address assigned to the compute node, a second group of one or more connectivity detection messages;

determine, by the controller node and based on information received from the particular data center, that the compute node is still available for execution on the particular data center;

receive, by the controller node and from the particular data center, at least one updated IP address assigned to the compute node; and update, by the controller node, the node inventory data store to store the at least one updated IP address assigned to the compute node.

11. The computing system of claim 10, wherein the instructions stored by the at least one computer-readable storage medium further cause the one or more processors to:

after receiving the resource request from the client device, select, by the controller node, the particular data center from the plurality of different data centers;

receive, by the controller node and from the particular data center, the first and second IP addresses that are each assigned to the compute node; and after storing the first and second IP addresses, determine, by the controller node and over multiple repeated iterations, whether the compute node is still accessible using the first IP address.

12. The computing system of claim 1, wherein the instructions stored by the at least one computer-readable storage medium that cause the one or more processors to determine, over the multiple repeated iterations, whether the compute node is still accessible using the first IP address further cause the one or more processors to:

responsive to receiving a request from either the client device or the controller node to access information associated with the compute node, initiate, by the controller node, execution of a first background process to determine whether the compute node is accessible; and store, by the background process executed by the controller node, and in the node inventory data store, an indication of whether the compute node is accessible, wherein the instructions stored by the at least one computer-readable storage medium that cause the one or more processors to determine that the compute node is still available for execution on the particular data center, receive the at least one updated IP address assigned to the compute node, and update the node inventory data store to store the at least one updated P address are performed by a second background process executed by the controller node.

13. The computing system of claim 10, wherein the instructions stored by the at least one computer-readable storage medium further cause the one or more processors to assign, by the controller node, a unique node identifier to the compute node, wherein the instructions stored by the at least one computer-readable storage medium that cause the one or more processors to determine, based on the information received from the particular data center, that the compute node is still available for execution on the particular data center further cause the one or more processors to:

send, by the controller node and to particular data center, the unique node identifier assigned to the compute node; and receive by the controller, the information from the particular data center, wherein the information indicates that the compute node is still available for execution on the particular data center.

14. The computing system of claim 13, wherein the first IP address assigned to the compute node comprises one of an external IP address gr a local IP address, wherein the second IP address assigned to the compute node comprises another one of the external IP address or the local IP address, wherein the instructions stored by the at least one computer-readable storage medium that cause the one or more processors to receive the at least one updated IP address assigned to the compute node further cause the one or more processors to receive, by the controller node and from the particular data center, an updated external IP address assigned to the compute node, and wherein the instructions stored by the at least one computer-readable storage medium that cause the one or more processors to update the node inventory data store further cause the one or more processors to update, by the controller node, the node inventory data store to store the updated external IP address assigned to the compute node.

15. The computing system of claim 10, wherein the first IP address assigned to the compute node comprises a local IP address, wherein the second IP address assigned to the compute node comprises an external IP address, wherein the instructions stored by the at least one computer-readable storage medium that cause the one or more processors to determine, based on the information received from the particular data center, that the compute node is still available for execution on the particular data center further cause the one or more processors to determine, by the controller node and based on one or more communications received from the compute node using the external IP address, that compute node is accessible using the external IP address, wherein the instructions stored by the at least one computer-readable storage medium that cause the one or more processors to receive the at least one updated IP address assigned to the compute node further cause the one or more processors to receive, by the controller node and from the compute node, an updated local IP address assigned to the compute node, and wherein the instructions stored by the at least one computer-readable storage medium that cause the one or more processors to update the node inventory data store further cause the one or more processors to update, by the controller node, the node inventory data store to store the updated local IP address assigned to the compute node.

16. The computing system of claim 10,
wherein the node inventory data store includes node information associated with the compute node, and
wherein the node information includes the at least one updated IP address assigned to the compute node, a unique node identifier of the compute node, status information indicating a current availability status associated with the compute node, and data center information indicating the particular data center associated with the compute node.

17. The computing system of claim 10, wherein the plurality of different data centers comprises one or more of (i) at least one remote cloud data center that is geographically remote from the client device, or (ii) at least one on-premises data center that is geographically co-located with the client device.

18. A computer-readable storage medium storing instructions that are executable by at least one processor to:
responsive to receiving a resource request from a client device, deploy, by a controller node, and for execution on a particular data center selected from a plurality of data centers, a compute node;
store, by the controller node and in a node inventory data store, first and second Internet Protocol (IP) addresses that are each assigned to the compute node, wherein the first IP address is different than the second IP address;
send, by the controller node and using the first IP address assigned to the compute node, a first group of one or more connectivity detection messages;
determine, by the controller node, that the compute node is not accessible using the first IP address at least by determining that the controller node failed to receive at least one reply in response to the first group of one or more connectivity detection messages; and
responsive to determining that the compute node is not accessible using the first IP address:
send, by the controller node and using the second IP address assigned to the compute node, a second group of one or more connectivity detection messages;
determine, by the controller node and based on information received from the particular data center, that the compute node is still available for execution on the particular data center;
receive, by the controller node and from the particular data center, at least one updated IP address assigned to the compute node; and
update, by the controller node, the node inventory data store to store the at least one updated IP address assigned to the compute node.

\* \* \* \* \*